United States Patent
Ghahary et al.

(10) Patent No.: US 7,442,726 B2
(45) Date of Patent: Oct. 28, 2008

(54) SPRAYABLE COATING COMPOSITION

(75) Inventors: Akbar Ghahary, Fort Lee, NJ (US); Yifang Zhao, Randolph, NJ (US)

(73) Assignee: SAFAS Corporation, Clifton, NJ (US)

( * ) Notice: Subject to any disclaimer, the term of this patent is extended or adjusted under 35 U.S.C. 154(b) by 607 days.

(21) Appl. No.: 11/138,878

(22) Filed: May 27, 2005

(65) Prior Publication Data

US 2006/0281831 A1    Dec. 14, 2006

(51) Int. Cl.
    *C09D 5/29*    (2006.01)
(52) U.S. Cl. ...................................................... 523/171
(58) Field of Classification Search .................. 523/171
    See application file for complete search history.

(56) References Cited

U.S. PATENT DOCUMENTS

| | | | |
|---|---|---|---|
| 4,085,246 A | 4/1978 | Buser et al. | |
| 4,433,070 A | 2/1984 | Ross et al. | |
| 4,664,954 A | 5/1987 | Hurd | |
| 4,678,819 A | 7/1987 | Sasaki et al. | |
| 4,734,452 A | 3/1988 | Hashimoto et al. | |
| 5,043,377 A | 8/1991 | Nogi et al. | |
| 5,055,327 A | 10/1991 | Baskin | |
| 5,244,941 A | 9/1993 | Bruckbauer et al. | |
| 5,286,290 A | 2/1994 | Risley | |
| 5,314,729 A | 5/1994 | Ikezoe et al. | |
| 5,476,895 A | 12/1995 | Ghahary | |

*Primary Examiner*—Edward J Cain
(74) *Attorney, Agent, or Firm*—Bernd W. Sandt; Sandt & Associates

(57) ABSTRACT

A sprayable granite-like coating composition useful for forming simulated stone surfaces, such as polished granite, such surfaces having high-impact strength, superior hardness and an aesthetically pleasing look. The coating composition comprises gel resin matrix based on unsaturated crosslinkable polyester or acrylic resins, a curing accelerator composition and granules comprising thermoset resins or mixtures of thermoplastic and thermoset resins. The gel coat resins and the granules are visually differentiable, substantially immiscible and substantially equal in density. The composition, is characterized by forming coatings of uniform thickness and quick curing that even at low thickness provides a uniform granite appearance.

13 Claims, No Drawings

SPRAYABLE COATING COMPOSITION

BACKGROUND OF THE INVENTION

The present invention relates generally to a composition useful in forming synthetic surfaces simulating various natural stone substances such as field stone, granite, marble and the like, and more particularly, to a composition comprising organic resin materials capable of being sprayed onto horizontal and vertical solid surfaces which, when cured, simulate various natural substances such as granite.

Processes currently exist for forming synthetic materials and surfaces, which mimic the appearance of various natural substances such as stone, marble and the like. Such materials are commonly used in the manufacture of floor and other types of tiles, shower enclosures, countertops, sinks, architectural facings, ornamental objects, and generally for any other purpose that marble, stone or the like are used.

One such example is a process utilizing a laminated sheet of material marketed under the trademark FORMICA. Such material is formed in large sheets and then cut and applied to the desired surface by adhesive or the like. Such sheets can be manufactured in solid colors or in various patterns, some of which simulate various stone or other textured material.

Another example is a process for preparing a material, which is commonly referred to as "cultured marble". "Cultured marble" is formed by first creating a mold of a desired shape, spraying the internal mold surface with a gel coat and then filling the mold with a conventional casting resin. Pigments are added to the resin to give it the desired color or pattern. After the resins have set, the mold is removed with the surface facing the mold forming the outer surface of the finished product.

Although many of the prior art methods for creating synthetic surfaces simulating stone and the like are generally acceptable, there is a continuing effort to develop compositions which give rise to more uniform, smoother coatings as well as surfaces which more closely simulate the various natural materials such as polished field stone, marble or granite and the like. Accordingly, there is a continuing need and desire to improve upon existing methods.

Examples of suitable gel coatings may be found in U.S. Pat. No. 4,543,366, issued Sep. 24, 1985 to Smith, U.S. Pat. No. 5,028,459, issued Jul. 2, 1991 to Lathrop and U.S. Pat. No. 4,664,982, issued May 12, 1987 to Genovese, et al., the contents of each of which are herein incorporated by reference.

In order to obtain a simulated stone coating the resin matrix must contain solid fillers, which provide the stone appearance. Such stone fillers have densities which are much higher than the matrix resin density and thus tend to settle out and coatings do not provide the desired simulated stone appearance. Various approaches have been developed to address this problem. For example, Lathrop uses crushed stone aggregate having a density substantially greater than that of the gel coat. Thus, to get a three-dimensional display, multiple sequential layers of gel coat and matrix must be applied. The subject invention overcomes this problem by using particulates which are substantially equal in density with the matrix resin composition and by means of controlling the crosslinking reaction to prevent settling.

A similar problem was addressed in the context of cast molded granite-like artificial stone in U.S. Pat. No. 5,043,377, issued Aug. 27, 1991 to Nogi, et al. Nogi, et al. suspended cured thermoplastic chips containing a large proportion of filler within a thermoplastic resin casting composition and stated that chips and liquid matrix should be close to each other in specific gravity. However in spraying compositions more uniform results without settling are obtained by using thermosetting resins as matrix resins and controlling the rate of crosslinking and curing.

U.S. Pat. No. 5,476,895 issued to Akbar Ghahary discloses sprayable coating compositions based on the concept of using a thermosetting resin matrix and crosslinked resin granules containing inorganic fillers. The granules and the matrix have essentially the same density. Although such compositions are useful in spray applications they are extremely sensitive to variations in viscosity and frequently do not provide uniform thickness in allowing the coating to flow before it is sufficiently crosslinked to stay in place, this is particularly true when the coating composition is sprayed onto a vertical surface.

The subject invention provides a means of increasing the rate of polymerization of the matrix resin when sprayed at room temperatures without discoloring the matrix resin base such that more uniform simulated stone coatings are produced. The subject coating compositions can be sprayed, brushed, rolled or curtain walled directly onto a surface as a final over-spray or sprayed, or brushed rolled or curtain walled onto the inside surface of a mold and then backed with a substrate, such as fiberglass or resin.

SUMMARY OF THE INVENTION

The invention provides a composition of matter for forming a coating, with a surface that simulates polished stone, such as granite. The coating compositions comprise a crosslinkable liquid resin matrix, a particulate crosslinked resin filler, hereinafter also referred to as granules, and a polymerization accelerator system. The matrix resin and the granules have substantially the same density by which is meant that granules will not visibly settle during the spraying and curing steps as a result of gravity. The term particulate is intended to characterize the granules as being substantially immiscible in the matrix resin.

The coating compositions of the present invention can be sprayed on any solid substrate by contracting the coating composition with the substrate using commercially available spraying equipment. Obviously the coating compositions can be used in other methods of applying a coating such as by painting or casting even though designed for spray applications. This is in contrast to many prior art compositions, which may be suitable as casting resins, but fail to provide useful spraying compositions, which require much higher reaction rates in the crosslinking of the matrix resin. Furthermore in contrast to available coating compositions, the compositions of the present invention allow for spraying on vertical surfaces and yet give rise to uniform coatings on such surfaces.

DETAILED DESCRIPTION OF THE INVENTION

The sprayable coating compositions of the present invention comprise a three-component system of a matrix resin, granules and an accelerator system, the key characteristic of which is that there is no visible settling of granules during the spraying and curing steps and that there is insubstantial flow of the coating during the spraying and curing steps to provide uniform thickness. Another key characteristic of the compositions of the present invention is that they can be sprayed and cured at room temperatures.

The preferred crosslinkable matrix resins are unsaturated polyester resins known in the industry as gel coat resins. They comprise in general a low molecular weight linear resin obtained by the condensation of a phthalic acid component with diols and also with an unsaturated component such as maleic anhydride to provide crosslinking properties. The polyester is dissolved normally in an aromatic monomer such as styrene, which acts as the crosslinking agent for the polyester resin when its polymerization is initiated. The polyester may be modified by adding other monomers in addition to styrene such as acrylic acids or acrylate esters to achieve specific properties. Also linear dicarboxylic acids, such as adipic acid or other aliphatic acid, may be added to the phthalic acid component to increase flexibility. Preferred unsaturated polyester resins are condensation products of isophthalic anhydride and neopentyl glycol (NPG) These resins are commercially available from a number of sources such as Reichhold, Ashland, Lilly Industries, Valspar and Polydine as gel coat resins. Another matrix resin that can be employed are acrylic resins based on such monomers as methyl methacrylate, ethyl acrylate suspended in the acrylate monomer known in the art as sirups. In order to crosslink the acrylic resin diunsaturated acrylate monomers are added to the sirup. Such diunsaturated monomers include glycidyl methacrylate and ethylene dimethacrylate ethylene glycol diacrylate, divinyl benzene, diallyl phthalate and allyl acrylate or methacrylate. The acrylate resins may further be modified to contain polyurethane resins in addition to or in place of the low molecular weight acrylic resin.

The polymerization of the sprayable matrix resin is usually initiated by the addition of free radical initiator and preferably a peroxy azo compound such as methyl ethyl ketone peroxide, t-butyl perbenzoate, and lauroyl peroxide 2,2' azobisisobutyronitrile.

It is generally desirable to include inorganic filler or fillers in with the matrix resin, in part to provide particulate background color for the simulated stone appearance, and in part to achieve substantially equal density with the granules to be added. Another preferred additive in order to improve the sprayability and uniformity of the sprayed composition is a thixotropic agent such as fumed silica. Similarly other ingredients that increase oxidative stability, UV-light resistance fire retardency or temperature stability may also be added.

The second component, the granules, are mixed into the fluid matrix resin to form the sprayable composition and provide the simulated stone appearance of the composite. The term "granules" as used herein is to include the terms "chips" and "particulates" which are oftentimes referred to by those skilled in the art. Granules are obtained from the same resins as employed in the matrix resins. Thus unsaturated polyester and acrylic resins can be employed to form the granules. The resins are admixed with inorganic fillers, pigments and any other desirable additive to provide the simulated stone properties when admixed after crosslinking in particulate form with the matrix resin. The density of the granule resin can be adjusted by using combinations of fillers of varying densities. Although inorganic fillers are usually heavier than the resin and therefore add to the density of the granules, such increases can be offset by using lighter fillers such as glass microbubbles or fumed silica. The granules are formed by casting the resin into an open mold, crosslinking the resin and then pulverizing the resin to the desired particle size range between 10 and 200 U.S. Mesh size. Preferred average particle sizes are in the range of 200 to 500 microns. Although the granules provide a "granite-like" stone appearance, they do not significantly detract from the overall transparent characteristic of the gel coat. The preferred filler used in the formation of the granules is alumina trihydrate, which is generally used in concentrations of 10 to 60% by weight of the granule. Other usable fillers include alkaline earth metal carbonates and silicates such as calcium carbonate or limestone, talc, clays, gypsum, chalk or marble. Since natural stone has the appearance of containing different colored particles it is generally desirable to add a pigment to the granule resin such as titanium dioxide to obtain a white granule and carbon black to obtain a black granule.

The granules also preferably contain a thermoplastic resin component the presence of which adds to the interfacial bonding of the granules with the matrix resin. Such thermoplastic components are obtained by adding an excess of monomer above that which is required for cross-linking to form a thermoplastic component. Thus in the case of a unsaturated polyester resin an excess of styrene is provided such that in addition to the crosslinked polyester the granules also contain some thermoplastic polystyrene. The preparation of granules as used in the present invention has been described in the literature such as U.S. Pat. No. 5,476,895 which is hereby incorporated by reference.

The third component of the sprayable compositions of the present invention is the accelerator, which allows the compositions to be sprayed with out running or thinning by accelerating the crosslinking of the matrix resin without color formation, particularly at room temperature spraying conditions. The accelerators of the present invention are at least a two component and preferably a three-component mixture comprising (a) an alkali metal carboxylate or calcium hydroxide or carboxylate, wherein the carboxylate has from 6 to 22 carbon atoms, (b) a hetero organic compound comprising either a di-nitrogen substituted amide, a tri-nitrogen substituted amine or a sulfur substituted mercaptan and (c) optionally a heavy metal compound selected from the class of copper, cobalt and zinc carboxylate where the carboxylate contains from 6 to 22 carbon atoms. Examples of suitable alkali metal carboxylates include sodium octoate, sodium benzoate sodium naphthenate, sodium laurate and sodium and potassium fatty acid carboxylates in general. Tertiary amide compounds include N,N'-dimetheylacetoacetamide, and N,N' diethylacetoacetamide. Tertiary amines useful in the accelerator compositions include Dimethyl p-toluidine, diethylaniline, dimethylaniline, N,N-bis(2-hydroxyethyl)p-toluidine and N,N-bis-(2-hudroxypropopyl)toluidine. Mercaptans useful in the accelerator include glycol dimercaptoacetate, glycol dimercaptopropionate, Isooctyl 3-mercaptopropionate, pentaerythritol tetra-(3-mercaptopropionate) and trimethylolpropane tri-(3-mercaptopropionate). Each component is usually employed in the range of 0.1 to 5% by weight of the matrix resin. In the case of unsaturated polyester resins it is preferred to employ the identified substituted nitrogen compounds with alkali metal carboxylates whereas in the case of the acrylic resin it is preferred to employ the substituted mercaptans in combination with alkaline earth metal carboxylates. The accelerator of the present invention are necessary elements in the matrix resin composition to achieve desired coating properties but can also be employed optionally in the preparation of the granules.

The coating produced is generally a transparent or highly translucent coating having a sufficient amount of alumina trihydrate therein to mask the color of the object being coated. Such coatings tend to be more stable at temperatures at which conventional gel coats break down. This increased stability may be due to thermal conductivity and thermal dissipation provided by the alumina trihydrate. The subject coatings generally have higher impact strength than coatings currently available on the market. In testing done to date, the subject coatings have been shown to exhibit twice the impact strength and greater hardness than currently available coatings.

The subject composition of matter is normally mixed and then sprayed through a conventional spraying apparatus. Such spraying mechanisms are not described here in detail, but are commonly known to those skilled in the coating art. Alternatively, the composition may be brushed, rolled, curtain walled, or applied by other means.

The following examples show the preparation of granules useful in the coating compositions of the present invention

EXAMPLE A 100 lbs. of white granule polyester composition was made with the following ingredients:

| | |
|---|---|
| 40 lbs. | Commercially available isophthalate/neopentyl glycol resin containing styrene monomer(Reichhold 32168-20) |
| 40 lbs. | Filler - alumina trihydrate |
| 4 lbs. | Pigment - titanium dioxide |
| 15 lbs. | Light weight filler - 3M glass micro bubbles |
| 1 lb. | Catalyst - "Triganox KSM" |

The foregoing polyester composition was blended in a vacuum mixer, where air was removed. Material was then transferred to a closed metal mold and heated in an oven for one (1) hour at 300° F. The resulting cured crosslinked resin was removed from the mold and crushed to not larger than 1/4" diameter in a granulator. Granulated material was then transferred to pulverizing machinery to create various particle sizes ultimately for suspension in Resin A. The pulverized material was then transferred to classification machinery to segregate the various sizes and eliminate particles not retained on U.S. Mesh 140. Particles finer than U.S. Mesh 140 can increase viscosity and alter color in the final sprayable surfacing material. Black granules were made by replacing the titanium dioxide with carbon black.

EXAMPLE B 100 lbs of the following white acrylic resin granule was made from the following composition

| | |
|---|---|
| 40 lbs. | Commercially available. polymethylmetharylate sirup containing MMA monomer (Degussa Corp) |
| 40 lbs. | Filler - alumina trihydrate |
| 4 lbs. | Pigment - titanium dioxide |
| 15 lbs. | Light weight filler - 3M glass microbubbles |
| 0.25 lbs | mercaptan |
| 1 lb. | Catalyst - Experox 41-25 |

The acrylic composition was blended in a vacuum mixer, where air was removed. Material was then transferred to a closed metal mold and cured in an oven for one (1) hour at room temperature, and then postcured for 30 min at 212° F. The resulting crosslinked acrylic resin was then comminuted into granules following the procedure as set forth in Example A. Black acrylic resin granules were made by replacing the titanium dioxide with carbon black.

The following exemplify the sprayable coating compositions of the present invention:

EXAMPLE I

Preparation of sprayable polyester coating material containing the following components by weight:

| | |
|---|---|
| 60% | Commercially available crosslinkable isophthalic/neopentyl glycol resin with styrene monomer (Reichhold 32168-20). |
| 5% | "3M" micro glass bubbles. |
| 10%* | Surface treated alumina trihydrate (ATH) with an average particle size of 15 microns used for added surface hardening properties and fire retardency. |
| 25% | 50/50 blend of white and black granules as prepared by the procedure OF Example A. |
| 0.5% | Sodium, octoate |
| 0.25% | N,N"-dimethylacetoacetamide |
| 0.15% | cobalt octoate |

*The ATH is preferably treated with a silane coupling agent to improve the contact between the matrix resin and the filler.

The components of the composition were combined with gentle agitation until the insoluble components were uniformly distributed in the matrix resin resulting in a composition having a viscosity of about 4,000 cps (No. 4 spindle). When combined with a peroxide initiator this composition will rapidly crosslink when sprayed on a hard surface.

EXAMPLE II

Preparation of sprayable acrylic resin coating composition containing the following components by weight:

| | |
|---|---|
| 40% | Methyl methacrylate resin (Degament 1004) |
| 5% | Acrylate urethane (Sartomer CN-991) |
| 5% | Butyl methacrylate |
| 10% | Methyl Methacrylate |
| 14% | Surface treated alumina trihydrate (ATH) |
| 25% | 50/50 blend of white and black granules as prepared by the procedure of Example B |
| 1% | Fumed silica |
| 0.25% | calcium octoate |
| 0.1% | Pentaerythritol tetra(3-mercaptopropionate) |
| 0.1% | Cobalt naphthenate |

The components of the composition were combined with gentle agitation until the insoluble components were uniformly distributed in the matrix resin resulting in a composition having a viscosity of about 4,000 cps (No. 4 spindle). When combined with a peroxide initiator, "Eperox 41-25", a commercially available peroxide this composition will rapidly crosslink when sprayed on a hard surface.

EXAMPLE III

| Components of Sprayable Polyester Composition | | |
|---|---|---|
| Material | | weight % |
| Isophthalic NPG resin with styrene | Polyester resin | 37 |

-continued

Components of Sprayable Polyester Composition

| Material | | weight % |
|---|---|---|
| Isophthalic NPG resin With Adipic acid/styrene | Polyester resin | 8 |
| Styrene | Monomer | 8 |
| Methyl Methacrylate | Monomer | 4 |
| Acrylic acid | Resin modifier | 0.5 |
| Aerosil 200 | Fumed silica | 1 |
| Silquest A-174NT | Silane coupling agent | 0.25 |
| BYK R605 | Viscosity adjust additive | 0.15 |
| Tinuvin 328 | UV absorber | 0.25 |
| Tinuvin 292 | Light stabilizer | 0.25 |
| GC04 | accelerator | 0.6 |
| alumina trihydrate | Filler - | 15 |
| Granules | 50/50 mixture white and and black - Example A | 25 |

Accelerator GC04 Composition

| Materials | weight % |
|---|---|
| Isopropanol solvent | 44 |
| Sodium Octoate solution (8% sodium) | 36 |
| Potassium naphthenate | 0.15 |
| Cobalt naphthenate solution (12% cobalt) | 5.75 |
| N,N'-dimethylacetoacetamide | 14 |
| Copper naphthenate solution (8% cobalt) | 0.1 |

The components of the composition were combined with gentle agitation until the insoluble components were uniformly distributed in the matrix resin resulting in a composition having a viscosity of about 4,000 cps (No. 4 spindle). When combined with a peroxide initiator, such as methyl ethyl ketone peroxide in a concentration of about 2%, this composition will rapidly crosslink when sprayed on a hard surface.

EXAMPLE IV

Preparation of a Sprayable Acrylic Resin Composition

| Weight % | Material | Type |
|---|---|---|
| 24 | Degament 1004 | Acrylic resin |
| 5 | CN991 | Acrylate Urethane resin |
| 1 | Ethylenglycidyl dimethacrylate | Crosslinking monmer |
| 8 | Butyl methacrylate | Monomer |
| 10 | Methyl Methacrylate | Monomer |
| 0.75 | Aerosil 200 | Fumed silica |
| 0.25 | SN-1000 | HEMA-Phosphate coupling agent |
| 0.25 | BYK 501 | defoamer |
| 0.25 | Calcium hydroxide | accelerator |
| 0.25 | Zinc octoate | accelerator |
| 0.25 | Pentaerythritol Tetra-(3-Mercaptopropionate) | accelerator accelerator |
| 30 | alumina trihydrate | Filler |
| 20 | Granules | 50/50 mixture white and black Example A |

The components of the composition were combined with gentle agitation until the insoluble components were uniformly distributed in the matrix resin resulting in a composition having a viscosity of about 4,000 cps (No. 4 spindle). When combined with a peroxide initiator, such as t-butyl monoperoxy maleate in a concentration of about 2%, this composition will rapidly crosslink when sprayed on a hard surface.

MANUFACTURING EXAMPLE 1

A prepared fiberglass mold was used to make a shower enclosure unit. The polyester spraying composition of Example I was combined with 1% by weight of MEK peroxide and sprayed using commercially available spraying equipment onto the surface of the mold to a thickness of 20 mil at room temperature. The sprayed coating rapidly crosslinked without any significant flow of the composition even on the vertical surfaces. The sprayed material was totally cured in 25 minutes at 75° F. Sprayed material was backed with fiberglass reinforced polyester and cured. The fabricated piece released from the mold within 2 hours had a magnificent surface with a gray granite appearance.

MANUFACTURING EXAMPLE 2

A pre-fabricated particleboard with 1.5" bullnose shaped for a kitchen counter top with backsplash was made. The polyester composition of Example 1 was sprayed over the fabricated counter top making sure to cover all the horizontal and vertical surfaces and bullnosed edge. The sprayed piece completely cured within 20-30 minutes at 75.degree. F. The cured counter top had a textured finish which may be used as sprayed. However, to simulate the texture and look of high polished natural granite, the piece was sanded to a satin finish similar in appearance to a solid surface material such as DUPONT CORIAN and then polished to obtain a glossy surface. The difference between the hardness of. In addition, the specific gravity identity between the matrix and the granules created a three-dimensional look within a clear matrix.

MANUFACTURING EXAMPLE 3

A clear acrylic panel was prepared and vacuum formed to the shape of a bathtub. To the acrylic resin spraying composition of Example I 1% by weight of the composition of PMA catalyst for was added. The above-described coating material was then sprayed using commercially available spraying equipment vertically on its exterior surface. Coating on the panel was cured 25-30 minutes at 75° F. The coating adhered to the acrylic sheet permanently because the acrylic acid in the composition had chemical bonding effects with the acrylic substrate before it became a part of the cross-linking. A combination of fiberglass and resin was applied to the exterior to reinforce the tub. The interior bathtub finish looks like glass-covered granite.

The foregoing examples are deemed to be illustrative and are not to be interpreted as limiting.

The invention claimed is:

1. A method of coating an article to form a simulated stone coating, which comprises (1) forming a fluid composition comprising (a) crosslinkable liquid resin matrix, wherein the resin is an unsaturated polyester or an unsaturated acrylic resin having distributed therein (b) a crosslinked particulate resin granule containing an inorganic filler, visually differentiable from the matrix resin and having substantially the same density as the matrix resin and (c) a crosslinking accelerator, based on the weight of the total composition, comprising (i) 0.1 to 2.5% of an alkali metal carboxylate or a calcium hydroxide or carboxylate, wherein the carboxylate moiety has from 6 to 22 carbon atoms, (ii) from 0 to 2.5% of a heavy metal carboxylate, wherein the carboxylate moiety has from 6 to 22 carbon toms, and wherein the metal is cobalt, copper or zinc and (iii) from 0.1 to 2.5% of a N,N',N" trisubstituted amine or a N,N' disubstituted amide or mercaptan selected from the group consisting of glycol, trimethylolpropane- and pentaerythritol-mercaptopropionates and mercaptoacetates, (2) adding an initiator and applying the resulting composition at ambient temperatures to a substrate.

2. The method of claim 1, wherein the matrix resin and the granule are made from an unsaturated polyester resin.

3. The method of claim 2, wherein the polyester resin is a styrene-containing isophthalate neopentyl glycol resin.

4. The method of claim 1, wherein the resin matrix is an acrylic resin.

5. The method of claim 2, wherein the accelerator is a combination of the alkali metal carboxylate and a N,N',N" trisubstituted amine or a N,N' disubstituted amide.

6. The method of claim 3, wherein the accelerator is an alkali metal carboxylate and a mercaptopropionate.

7. A fluid coating composition which comprises (a) a crosslinkable liquid resin matrix, wherein the resin is an unsaturated polyester or an unsaturated acrylic resin containing therein uniformly distributed (b) a crosslinked particulate resin granule containing an inorganic filler, visually differentiable from the matrix resin and having substantially the same density as the matrix resin and (c) a crosslinking accelerator comprising by weight of the total composition (i) 0.1 to 2.5% of an alkali metal or alkaline earth metal carboxylate, wherein the carboxylate moiety has from 6 to 22 carbon atoms, (ii) from 0 to 2.5% of a heavy metal carboxylate, wherein the carboxylate moiety has from 6 to 22 carbon atoms, and wherein the metal is cobalt, copper or zinc and (iii) from 0.1 to 2.5% of a N,N'N" trisubstituted amine or a N,N' disubstituted amide or mercaptan selected from the group consisting of glycol-, trimethylolpropane and pentaerythritol-mercaptopropionates and mercaptoacetates.

8. The composition of claim 7, wherein the matrix resin is an unsaturated isophthalate neopentyl glycol resin and the accelerator comprises a sodium carboxylate and a N,N',N" trisubstituted amine or N,N' disubstituted amide.

9. The composition of claim 7, wherein the matrix resin is an acrylic resin and the accelerator comprises an alkaline earth metal carboxylate and a mercaptan.

10. The composition of claim 7, wherein the granule and the matrix resin contain alumina trihydrate.

11. The composition of claim 8, wherein the accelerator additionally contains a cobalt carboxylate.

12. The composition of claim 9, wherein the acrylic resin is crosslinkable polymethyl methacrylate resin sirup.

13. The coating composition of claim 8, wherein the sodium carboxylate is sodium octoate and the amide is N,N' dimethyl acetoacetamide.

* * * * *